US010252945B2

(12) United States Patent
Vissman et al.

(10) Patent No.: US 10,252,945 B2
(45) Date of Patent: *Apr. 9, 2019

(54) BIOCERAMIC COMPOSITIONS

(71) Applicant: Multiple Energy Technologies LLC, Washington, PA (US)

(72) Inventors: Shannon Vissman, Upper St. Clair, PA (US); Francisco José Cidral Filho, Florianópolis (BR); Francisco de Paula Moreira, Florianópolis (BR); Steven Midttun, Boca Raton, FL (US)

(73) Assignee: MULTIPLE ENERGY TECHNOLOGIES LLC, Washington, PA (US)

(*) Notice: Subject to any disclaimer, the term of this patent is extended or adjusted under 35 U.S.C. 154(b) by 191 days.

This patent is subject to a terminal disclaimer.

(21) Appl. No.: 13/760,546

(22) Filed: Feb. 6, 2013

(65) Prior Publication Data

US 2014/0087040 A1    Mar. 27, 2014

Related U.S. Application Data

(60) Provisional application No. 61/705,986, filed on Sep. 26, 2012.

(51) Int. Cl.
*B32B 1/02* (2006.01)
*C04B 35/44* (2006.01)
(Continued)

(52) U.S. Cl.
CPC ............. *C04B 35/44* (2013.01); *C04B 33/04* (2013.01); *C08K 3/346* (2013.01); *C12H 1/165* (2013.01);
(Continued)

(58) Field of Classification Search
CPC ..... B32B 1/02; Y10T 428/1352; C04B 35/44; C04B 2235/3427; C12H 1/165; C08K 3/346; D06M 2101/34
(Continued)

(56) References Cited

U.S. PATENT DOCUMENTS 2,929,414 A * 3/1960 Lienhard ............ D03D 15/0072
139/420 B
3,969,551 A * 7/1976 Ellsworth ................ D06Q 1/00
264/DIG. 5
(Continued)

FOREIGN PATENT DOCUMENTS

BR    PI0801804-9    2/2009
BR    PI08018049     2/2009
(Continued)

OTHER PUBLICATIONS

PCT/US2013/060636 International Preliminary Report on Patentability dated Apr. 9, 2015.
(Continued)

*Primary Examiner* — Marc A Patterson
(74) *Attorney, Agent, or Firm* — Wilson Sonsini Goodrich & Rosati

(57) ABSTRACT

This invention relates to compositions and applications for a bioceramic composition that includes from about 45 to about 55% by weight of kaolinite ($Al_2Si_2O_5(OH)_4$); from about 5 to about 15% by weight of tourmaline; from about 3 to about 13% by weight of aluminum oxide ($Al_2O_3$); from about 11 to about 19% by weight of silicon dioxide ($SiO_2$); and from about 3 wt % to about 13 wt % zirconium oxide ($ZrO_2$).

7 Claims, 8 Drawing Sheets

(51) Int. Cl.
| | |
|---|---|
| *C12H 1/16* | (2006.01) |
| *C04B 33/04* | (2006.01) |
| *C08K 3/34* | (2006.01) |
| *D06M 11/45* | (2006.01) |
| *D06M 11/46* | (2006.01) |
| *D06M 11/79* | (2006.01) |
| *D06M 16/00* | (2006.01) |
| *D06M 23/08* | (2006.01) |
| *D06M 23/16* | (2006.01) |
| *D06M 101/34* | (2006.01) |

(52) U.S. Cl.
CPC ............ *D06M 11/45* (2013.01); *D06M 11/46* (2013.01); *D06M 11/79* (2013.01); *D06M 16/00* (2013.01); *D06M 23/08* (2013.01); *D06M 23/16* (2013.01); *C04B 2235/3217* (2013.01); *C04B 2235/3244* (2013.01); *C04B 2235/3409* (2013.01); *C04B 2235/3418* (2013.01); *C04B 2235/3427* (2013.01); *D06M 2101/34* (2013.01)

(58) Field of Classification Search
USPC ................... 428/34.1, 34.2, 35.7, 35.9, 36.9
See application file for complete search history.

(56) References Cited

U.S. PATENT DOCUMENTS

| | | | |
|---|---|---|---|
| 4,175,556 A | 11/1979 | Freezer | |
| 4,344,908 A | 8/1982 | Smith et al. | |
| 4,680,822 A * | 7/1987 | Fujino | A61N 5/06 5/421 |
| 4,968,531 A | 11/1990 | Maeda | |
| 5,208,089 A | 5/1993 | Norris | |
| 5,258,228 A | 11/1993 | Komuro | |
| 5,296,531 A | 3/1994 | Belde et al. | |
| 5,299,335 A | 4/1994 | Ivester et al. | |
| 5,645,934 A | 7/1997 | Ducheyne | |
| 5,820,348 A | 10/1998 | Fricke | |
| D405,885 S | 2/1999 | Pinter | |
| 5,894,067 A | 4/1999 | Kim | |
| 5,935,550 A | 8/1999 | Mohri et al. | |
| 5,972,815 A | 10/1999 | Bae | |
| 6,074,754 A | 6/2000 | Jacobsen et al. | |
| 6,207,077 B1 | 3/2001 | Burnell-Jones | |
| 6,207,600 B1 * | 3/2001 | Nakajima | D04H 3/007 428/373 |
| 6,264,907 B1 * | 7/2001 | Matsuda | C01B 33/18 162/181.6 |
| 6,506,403 B1 | 1/2003 | Yu | |
| 6,516,229 B1 | 2/2003 | Wey | |
| 6,645,517 B2 | 11/2003 | West et al. | |
| 6,651,256 B1 | 11/2003 | Swift | |
| 6,669,882 B2 | 12/2003 | Seok | |
| D489,904 S | 5/2004 | Lee | |
| 6,797,377 B1 | 9/2004 | Delucia et al. | |
| 6,884,256 B2 | 4/2005 | Huang et al. | |
| 6,951,900 B2 | 10/2005 | Blanchard et al. | |
| 7,056,845 B2 | 6/2006 | Waeber et al. | |
| 7,063,801 B2 | 6/2006 | Sato | |
| 7,074,499 B2 | 7/2006 | Schnurer et al. | |
| 7,311,209 B2 | 12/2007 | Bentz et al. | |
| D598,660 S | 8/2009 | Schaller | |
| 7,824,350 B2 | 11/2010 | Lu | |
| D629,210 S | 12/2010 | Hong | |
| D631,971 S | 2/2011 | Turtzo et al. | |
| 8,104,482 B2 | 1/2012 | Komuro | |
| 8,231,968 B2 | 7/2012 | Lin et al. | |
| D664,739 S | 8/2012 | Gibson | |
| D667,226 S | 9/2012 | Levy | |
| 8,333,018 B2 | 12/2012 | Lin et al. | |
| 8,366,757 B2 | 2/2013 | Oliveira et al. | |
| 8,388,750 B2 | 3/2013 | Gay et al. | |
| 8,409,262 B2 | 4/2013 | Lin et al. | |
| 8,491,825 B2 | 7/2013 | Lin et al. | |
| D704,455 S | 5/2014 | Blakely et al. | |
| 8,815,158 B2 | 8/2014 | Zheng et al. | |
| 8,968,819 B2 | 3/2015 | Hirata | |
| 8,980,775 B2 | 3/2015 | Francy et al. | |
| 9,044,384 B2 | 6/2015 | Canova et al. | |
| 9,120,959 B2 | 9/2015 | Hara et al. | |
| D746,543 S | 1/2016 | McClain | |
| 9,376,576 B2 | 6/2016 | Jung et al. | |
| D766,597 S | 9/2016 | Vissman et al. | |
| 9,833,509 B2 | 12/2017 | Vissman et al. | |
| 9,962,441 B2 | 5/2018 | Vissman | |
| 2002/0014716 A1 | 2/2002 | Seok | |
| 2002/0042641 A1 | 4/2002 | Johnson et al. | |
| 2002/0195751 A1 | 12/2002 | Kim et al. | |
| 2003/0225356 A1 | 12/2003 | Kulichikhin et al. | |
| 2004/0043174 A1 | 3/2004 | Schnurer et al. | |
| 2004/0087430 A1 | 5/2004 | Sola | |
| 2004/0202899 A1 | 10/2004 | Komuro | |
| 2004/0225049 A1 | 11/2004 | Komuro | |
| 2005/0060807 A1 | 3/2005 | Kaizuka | |
| 2005/0066448 A1 | 3/2005 | Waeber et al. | |
| 2005/0171584 A1 | 8/2005 | Slingo | |
| 2005/0227047 A1 | 10/2005 | Sutter et al. | |
| 2005/0233888 A1 | 10/2005 | Seneschal et al. | |
| 2005/0241069 A1 | 11/2005 | Lin | |
| 2006/0137701 A1 * | 6/2006 | Snaidr | 131/334 |
| 2006/0275348 A1 | 12/2006 | Komuro | |
| 2007/0116775 A1 | 5/2007 | Lee | |
| 2009/0065732 A1 | 3/2009 | Yeh et al. | |
| 2009/0137171 A1 | 5/2009 | Waeber et al. | |
| 2009/0171266 A1 | 7/2009 | Harris | |
| 2009/0267271 A1 | 10/2009 | Kim | |
| 2010/0186917 A1 * | 7/2010 | Simonson et al. | 162/175 |
| 2010/0227790 A1 | 9/2010 | Mayer et al. | |
| 2010/0282433 A1 | 11/2010 | Blackford | |
| 2011/0021098 A1 | 1/2011 | Tabellion et al. | |
| 2011/0027548 A1 | 2/2011 | Nusser et al. | |
| 2011/0059037 A1 | 3/2011 | Canova et al. | |
| 2011/0112461 A1 | 5/2011 | Hirata | |
| 2011/0208099 A1 | 8/2011 | Naghavi et al. | |
| 2012/0060344 A1 * | 3/2012 | Smeets | B60J 11/06 29/428 |
| 2012/0135485 A1 | 5/2012 | Koros et al. | |
| 2014/0079920 A1 | 3/2014 | Blakely | |
| 2014/0173801 A1 | 6/2014 | Bell | |
| 2014/0187413 A1 | 7/2014 | Lagaron Cabello et al. | |
| 2014/0197562 A1 | 7/2014 | Piccinini et al. | |
| 2014/0209594 A1 | 7/2014 | Besner | |
| 2014/0255664 A1 | 9/2014 | Gartmann et al. | |
| 2014/0264186 A1 | 9/2014 | Spatz et al. | |
| 2014/0324132 A1 | 10/2014 | Wey | |
| 2015/0017856 A1 | 1/2015 | Davis et al. | |
| 2015/0132351 A1 | 5/2015 | Canova et al. | |
| 2015/0224230 A1 | 8/2015 | Hirata | |
| 2015/0291868 A1 | 10/2015 | Rajagopalan et al. | |
| 2015/0335742 A1 | 11/2015 | Vissman et al. | |
| 2016/0136386 A1 | 5/2016 | Vissman et al. | |
| 2016/0136452 A1 | 5/2016 | Vissman | |
| 2016/0143838 A1 | 5/2016 | Canova et al. | |
| 2016/0151300 A1 | 6/2016 | Madvin | |
| 2017/0049890 A1 | 2/2017 | Vissman | |
| 2018/0055933 A1 | 3/2018 | Vissman et al. | |

FOREIGN PATENT DOCUMENTS

| | | | |
|---|---|---|---|
| BR | PI08057826 | | 8/2010 |
| BR | MU90001257 | | 9/2011 |
| BR | MU90010191 | | 1/2012 |
| CN | 2568221 Y | | 8/2003 |
| CN | 1488807 A | | 4/2004 |
| CN | 1887784 A | * | 1/2007 |
| CN | 100366574 C | | 2/2008 |
| CN | 102553623 A | | 7/2012 |
| EP | 1816254 | | 8/2007 |
| EP | 2900621 A1 | | 8/2015 |
| EP | 3140004 A1 | | 3/2017 |
| GB | 883264 | * | 11/1961 |

(56) References Cited

FOREIGN PATENT DOCUMENTS

| | | | |
|---|---|---|---|
| GB | 1093041 | * | 11/1967 |
| GB | 1378140 | * | 12/1974 |
| GB | 2073613 | | 10/1981 |
| GB | 2463264 A | | 3/2010 |
| JP | 07331501 | | 12/1995 |
| JP | 09225045 A | | 9/1997 |
| JP | 11335966 A | * | 5/1998 |
| JP | 2000-119987 A | * | 4/2000 |
| JP | 2001192257 A | | 7/2001 |
| JP | 2004107113 A | | 4/2004 |
| JP | 2004359811 A | | 12/2004 |
| JP | 2008308353 A | | 12/2008 |
| JP | 2008308354 A | | 12/2008 |
| JP | 2010212156 A | | 9/2010 |
| JP | 2011506668 A | | 3/2011 |
| KR | 20050046213 A | | 5/2005 |
| KR | 100783486 B1 | | 12/2007 |
| KR | 20090098932 A | | 9/2009 |
| KR | 20100009129 A | | 1/2010 |
| KR | 1020100009129 A | * | 1/2010 |
| KR | 101067409 | | 9/2011 |
| KR | 101067409 B1 | | 9/2011 |
| WO | WO-2002/059414 | | 8/2002 |
| WO | WO 2006/007753 A1 | | 1/2006 |
| WO | WO 2009/118419 | | 10/2009 |
| WO | WO-2009/124367 | | 10/2009 |
| WO | WO-2011059037 A1 | | 5/2011 |
| WO | WO-2012135485 A2 | | 10/2012 |
| WO | WO 2013/053587 A1 | | 4/2013 |
| WO | WO-2013182568 A2 | | 12/2013 |
| WO | WO 2013/182568 | | 1/2014 |
| WO | WO-2015171467 A1 | | 11/2015 |

OTHER PUBLICATIONS

Australian Patent Application No. 2013323956 Examination Report dated May 29, 2015.
Australian Patent Application No. 2013323956 Patent Examination Report No. 2 dated Nov. 6, 2015.
Aksenov, M.Y.; Markesbery, W.R. "Changes in thiol content and expression of glutathione redox system genes in the hippocampus and cerebellum in Alzheimer disease." NeurosciLett, v. 302, p. 141-145, 2001.
Bannister, J.V.; Calabrese, L. Assays for superoxide dismutase. Methods Biochem Anal, v. 32, p. 279-312, 1987.
Cidral-Filho, F. and D. Martins. "Neurobiological Mechanisms and Perspectives on Far-Infrared Emitting Ceramic Materials for Pain Relief" J Yoga Phys Ther. 4 (2):159.
Esterbauer, H., Cheeseman, K.H. "Determination of aldehydic lipid peroxidation products: malonaldehyde and 4-hydroxynonenal." Methods Enzymol, v. 186, p. 407-421, 1990.
Hong, R. "Effects of Heat Therapy using a far infrared rays heating element for dysmenorrhea in high school girls". J Korean Acad. Nurs vol. 41 No. 1, 141-148, 2011.
Ke Y. et al. "Effects of Somatothermal Far-Infrared Ray on Primary Dysmenorrhea: A Pilot Study". Evidence-Based Complementary and Alternative Medicine, vol. 2012, Article ID 240314, doi: 10.1155/2012/240314.
Leung T. et al. "Physical-chemical Test Platform for Room Temperature, Far-infrared Ray Emitting Ceramic Materials (cFIR)." Published online on Oct. 12, 2011; doi: 10.1002/jccs.201190101.
Levine, R.L.; Garland, D.; Oliver, C.N.; Amici, A.; Climent, I.; Lenz, A.G.; Ahn, B.W.; Shaltiel, S.; Stadman, E.R. "Determination of carbonyl content in oxidatively modified proteins." Methods Enzymol, v. 186, p. 464-478, 1990.
Lin et al. "Enhancement of Transdermal Delivery of Indomethacin and tamoxifen by Far-Infrared Ray-Emitting Ceramic material (BIOCERAMIC): A Pilot Study." Translational Medicine 2013, 3:1.
Lin et al., "Antioxidant Effect of Far-Infrared Radiation in Human" Journal of Public Health Frontier. Jun. 2013, vol. 2 Iss. 2, pp. 97-102.
Lowry, O.H.; Rosebrough, N.J.; Farr, A. "Protein measurement with the Folin phenol reagent." J BiolChem, v. 193, p. 265-275, 1951.
Vatansever F. and Hamblin M. "Far infrared radiation (FIR): its biological effects and medical applications." Photon Lasers Med 2012; 1(4): 255-266.
"What is Complementary and Alternative Medicine?" (Oct. 2008), Retrieved Aug. 2012 from http://nccam.nih.gov/health/whatiscam.
York R. and Gordon I., Effect of optically modified polyethylene terephthalate fiber socks on chronic foot pain. BMC Complementary and Alternative Medicine 2009, 9:10.
Colombia Patent Application No. 15-090.148 Official Action dated May 17, 2015.
EP Application No. 13842936.0 Extended European Search Report dated Jul. 17, 2015.
Koo et al. The application of PCMMcs and Sic by commercially direct dual-complex coating on textile polymer. Applied Surface Science 255:8313-8318. 2009.
International Search Report and Written Opinion of the International Searching Authority, dated Dec. 10, 2013, International Application No. PCT/US2013/060636.
Yoo et al., "Investigation of jewelry powders radiating far-infrared rays and the biological effects on human skin", J. Cosmet Sci., 53, (May/Jun. 2002), 175-184.
Ko et al., "Effect of Ceramic-Impregnated "Thermoflow" Gloves on Patients with Raynaud's Syndrome: Randomized, Placebo-Controlled Study", Alternative Medicine Review, Aug. 2002; vol. 7(4), pp. 328-335.
Conrado et al., "Reduction in body measurements after use of a garment made with synthetic fibers embedded with ceramic nanoparticles", Journal of Cosmetic Dermatology, 10, 1, 30-35, 2011.
Leung et al., "In vitro cell study of the Possible Anti-inflammatory and Pain Relief Mechanism of Far-infrared Ray-emitting Ceramic Material", J. Med. And Biol. Eng. 33(2): 179-184.
Bagnato et al., "Far infrared emitting plaster in knee osteoarthritis: a single blinded, randomised clincal trial", Reumatismo, 2012, 64 (6): 388-394.
Hsieh et al., "Local and Systemic Cardiovascular Effects from Monochromatic Infrared Therapy in Patients with Knee Osteoarthritis: A Double-Blind, Randomized, Placebo-Controlled Study", Evidence-Based Complementary and Alternative Medicine, vol. 2012, Article ID 583016, 9 pages.
Leung et al., "Biological effects of melt spinning fabrics composed of 1% bioceramic material", Textile Research Journal, 82(11) 1121-1130, downloaded from trj.sagepub.com Mar. 11, 2013.
Leung et al., "Bone and Joint Protection Ability of Ceramic Material with Biological Effects", Chinese Journal of Physiology 55(1): 47-54, 2012.
Leung et al., "Direct and Indirect Effects of Ceramic Far Infrared Radiation on the Hydrogen Peroxide-scavenging Capacity and on Murine Macrophages under Oxidative Stress", Journal of Medical and Biological Engineering, 31(5): 345-351.
Leung et al., "Effects of Far Infrared Rays Irradiated from Ceramic Material (BIOCERAMIC) on Psychological Stress-Conditioned Elevated Heart Rate, Blood Pressure, and Oxidative Stress-Suppressed Cardiac Contractility", Chinese Journal of Phsysiology 55(5): 323-330, 2012.
eSilva et al., "Effects of the Use of MIG3 Bioceramics Fabrics Use—Long Infrared Emitter—in Pain, Intolerance to Cold and Periodic Limb Movements in Post-Polio Syndrome", Arq Neuropsiquiatr 2009; 67(4): 1049-1053.
Kim et al., "Bioceramic Effects to Enhance Secondary Metabolites Production in Tissue Culture of Some Medicinal Plants", Korean J. Medicinal Crop Sci. 12(2) : 118-122 (2004).
Beever, "Far-infrared saunas for treatment of cardiovascular risk factors" Canadian Family Physician, vol. 55: Jul. 2009.
Gale et al., "Infrared therapy for chronic low back pain: A randomized, controlled trial", Pain Res Manage, vol. 11, No. 3 Autumn 2006.
Liau et al., "Inhibitory Effects of Far-Infrared Ray-Emitting Belts on Primary Dysmenorrhea", International Journal of Photoenergy, vol. 2012, Art. ID 238468, 6 pages.

(56) References Cited

OTHER PUBLICATIONS

Leung et al., "Protective effect of non-ionized radiation from far infrared ray emitting ceramic material (cFIR) against oxidative stress on human breast epithelial cells", Articles in Press, J. Med. Biol. Eng. (Jul. 28, 2012), doi: 10.5405/jmbe.1133.
Agathocleous et al. Preliminary Results of a Phase I/II Study of Weekly or Twice Weekly Bortezomib in Combination with Rituximab, in Patients with Follicular Lymphoma, Mantle Cell Lymphoma and Waldenstrom's Macroglobulinaemia. Blood (ASH Annual Meeting Abstracts) 110:Abstract 2559 (2007).
Cidral-Filho et al. Effect of Far Infrared Emitted by Bioceramics on Clinical Measures of Physical Fitness, May 7, 2014, vol. 20, Issue No. 5, A71.
Cidral-Filho et al. Far Infrared Emitted by Ceramic Materials Increases Paw Temperature and Reduces Mechanical Hypersensitivity and Knee Edema in a Rat Model of Monoiodoacetate-Induced Osteoarthritis, Jul. 28-30, 2014, vol. 3, Issue No. 2.
Cidral-Filho et al. Neurobiological Mechanisms and Perspectives on Far-Infrared Emitting Ceramic Materials for Pain Relief, 2014, vol. 4, Issue No. 2, 1000159.
Emeraline; et al. Effect of Far Infrared Emitted by Bioceramics on Parameters of Physical Performance in Mice, May 7, 2014, vol. 20, Issue No. 5, A34-A34.
Emeraline; et al. Far Infrared Emitted by Bioceramics Reduces Mechanical and Thermal Hyperalgesia in an Animal Model of Chronic Inflammatory Pain, May 7, 2014, vol. 20, Issue No. 5.
Emeraline; et al. Far Infrared Therapy Emitted by Bioceramics Improves Pstural Sway in Young Brazilian University Judokas, May 7, 2014, vol. 20, Issue No. 5, A73-A73.
European Patent Application No. 13842936 Extended European Search Report dated Jul. 17, 2015.
Far Infrared Emitted by Bioceramics Reduced Hypernociception of Inflammatory Origin in Mice Study by University of Southern Santa Catarina Laboratory of Experimental Neuroscience. Feb. 2014.
Lai; et al. Effects of Far-Infrared Irradiation on Myofascial Neck Pain: a Randomized, Double-Blind, Placebo-Controlled Pilot Study, Feb. 2014, vol. 20, Issue No. 2, 123-129.
Leung; et al. Physiological Effects of Bioceramic Material: Harvard Step, Resting Metabolic Rate and Treadmill Running Assessments, Dec. 21, 2013, vol. 56, Issue No. 6, 1-7.
Martins; et al. Far-Infrared Emitting Ceramic Meterial-Impregnated Fabrics Reduces Pain and Improves Quality of Life in Patients with Fibromyalgia: Double-Blinded Randomized Placebo Controlled Trial, Mar. 13, 2015, Abstract ID 1007.
Martins; et al. Neuromodulation by Far-Infrared Emitting Ceramic Material in an Animal Model of Persistent Inflammatory Pain, Mar. 13, 2015, Abstract.
Tuduvz LLC Far Infrared Therapy. Healing with Far Infrared Therapy. Website [online] Apr. 13, 2014 [retrieved on Aug. 11, 2015] Retrieved from the Internet: http://webarchive.org/web/20140413115846/http://www.endtimesessentials.com/far-infrared-therapy. (Accessed Sep. 11, 2015).
XP-002740908 Manufacturing method and its material of painting medium having bio-ceramics, KR 2005 0046213 A, May 18, 2005.
XP002740909, Method for preparing porous tourmaline slab with photocatalytic performance, CN 102 553 623 A, Jul. 11, 2012.
XP002740910, Porcelain tile and its manufacturing method. JP 2008 308353, Dec. 25, 2008.
Australian Patent Application No. 2013323956 Examiner's Report No. 3 dated Jan. 22, 2016.
Chinese Patent Application No. 201380049767.7 Office Action dated Jan. 22, 2016.
Eurasia Patent Application No. 201590577 Office Action dated Jan. 18, 2016.
Lai et al., Effects of far-infrared irradiation on myofascial neck pain: A randomized, double-bind, placebo-controlled pilot study The Journal of Alternative and Complementary Medicine, 0(0):1-7 (2013).
Leung et al., Physiological effects of bioceramic material: Harvard step, resting metabolic rate and treadmill running assessments. Chinese Journal of Physiology, 56(x):1-7 (2013).
PCT/US2015/028910 International Search Report and Written Opinion dated Sep. 1, 2015.
Tuduvz, LLC, Far Infrared therapy: Healing with far infrared therapy Website (online), Apr. 13, 2014 (retrieved on Aug. 11, 2015), www.endtimeessentials.com/far-infrared-therapy, 3 pages.
U.S. Appl. No. 29/495,157 Office Action dated Feb. 11, 2016.
Australia Patent Application No. 2013323956 Notice of Acceptance dated Apr. 13, 2016.
Colombia Patent Application No. 15-090.148 Official Action dated Jun. 17, 2016.
U.S. Appl. No. 14/965,741 Preinterview First Office Action dated Apr. 18, 2016.
U.S. Appl. No. 29/495,157 Ex Parte Quayle Office Action dated May 9, 2016.
U.S. Appl. No. 14/965,741 First Action Interview—Office Action dated Sep. 14, 2016.
U.S. Appl. No. 14/965,746 Office Action dated Aug. 25, 2016.
Chinese Patent Application No. 201380049767.7 Office Action dated Sep. 20, 2016.
Colombia Patent Application No. NC2016/0003955 Office Action dated Oct. 20, 2016.
Columbia Patent Application No. 15-090.148 Official Action dated Nov. 11, 2016.
PCT/US2015/028910 International Preliminary Report on Patentability dated Nov. 17, 2016.
U.S. Appl. No. 14/702,467 Office Action dated Oct. 7, 2016.
U.S. Appl. No. 14/965,741 First Action Interview Office Action Summary dated Sep. 14, 2016.
U.S. Appl. No. 14/965,741 Office Action dated Feb. 9, 2017.
Eurasian Patent Application No. 201590577 Office Action dated Apr. 4, 2017 (no translation provided to date).
U.S. Appl. No. 14/702,467 Office Action dated May 8, 2017.
U.S. Appl. No. 14/965,746 Office Action dated Mar. 23, 2017.
BR-P108057826.
Co-pending U.S. Appl. No. 29/560,574, filed Apr. 7, 2016.
Eurasian Patent Application No. 201590577 Office Action dated Aug. 30, 2016.
JP-11335966 (A).
U.S. Appl. No. 14/069,749 Office Action dated Jul. 28, 2016.
U.S. Appl. No. 14/965,746 Office Action dated Mar. 24, 2016.
U.S. Appl. No. 15/826,584 Office Action dated Feb. 9, 2018.
U.S. Appl. No. 14/965,741 Office Action dated Jul. 3, 2017.
U.S. Appl. No. 14/965,746 Office Action dated Aug. 10, 2017.
Chinese Patent Application No. 201380049767.7 Third Office Action dated Oct. 23, 2017.
Chinese Patent Application No. 2015800367193 Office Action dated May 2, 2018.
Colombia Patent Application No. NC2016/0003955 Office Action dated Mar. 20, 2018.
Co-pending U.S. Appl. No. 16/041,449, filed Jul. 20, 2018.
Eurasian Patent Application No. 201692098 Office Action dated Jul. 10, 2018.
European Patent Application No. 13842936.0 Office Action dated Apr. 3, 2018.
European Patent Application No. 15789387.6 extended European Search Report dated Dec. 8, 2017.
Israeli Patent Application No. 237601 Examination Report dated Nov. 1, 2017.
Japanese Patent Application No. 2015-534562 Office Action dated May 7, 2018.
Japanese Patent Application No. 2015-534562 Office Action dated Sep. 26, 2017.
New Zealand Patent Application No. 705601 First Examination Report dated Feb. 16, 2018.
U.S. Appl. No. 14/965,746 Office Action dated Jun. 28, 2018.
U.S. Appl. No. 15/308,283 Office Action dated Jun. 13, 2018.

* cited by examiner

BIOCERAMIC COMPOSITIONS

RELATED APPLICATIONS AND CLAIM OF PRIORITY

This document claims priority to U.S. Provisional Patent Application No. 61/705,986, filed Sep. 26, 2012, the disclosure of which is incorporated by reference in this application.

BACKGROUND

In 1800, Dr. F. W. Herschel of Great Britain found and reported to the academic world a wavelength ranging from 0.7 to 1000 microns, just beyond visible light, called infrared, which has strong physical properties and great thermal activity. The natural resonant frequency range of water and living organisms, including man, falls within the infrared range. For example, the wavelength range of 6-18 µm is well known to be beneficial to the human body by virtue of its activating and energizing effect on the body. Indeed, human skin radiates 9.36 µm infrared wave which is very close to the resonant frequency of a water molecule—and rightly so since our bodies are about 70% water. Infrared waves can be the safest and most beneficial energy source available According to The National Center for Complementary and Alternative Medicine (NCCAM), "some CAM practices involve manipulation of various energy fields to affect health. Such fields may be characterized as veritable (measurable) or putative (yet to be measured). Practices based on veritable forms of energy include those involving electromagnetic fields (e.g., magnet therapy and light therapy)." (*What is Complementary and Alternative Medicine?* (October 2008). Retrieved Aug. 31, 2012, from http://nccam.nih.gov/health/whatiscam).

Bioceramics include ceramics which radiate beneficial infrared waves. Because of their advantages to human health, bioceramics are now used for various purposes including biomedicine and living necessaries. These aim to utilize the effects of the infrared radiation emitted therefrom, including, for example, maintenance of freshness of foods, deodorization, vitalization, etc. There is a need therefore, to develop additional bioceramic compositions and uses thereof that provide additional beneficial effects.

SUMMARY

There is provided in accordance with various embodiments a bioceramic composition that includes from about 45 wt % to about 55 wt % kaolinite ($Al_2Si_2O_5(OH)_4$); from about 5 wt % to about 15 wt % tourmaline; from about 3 wt % to about 13 wt % aluminum oxide ($Al_2O_3$); from about 11 wt % to about 19 wt % silicon dioxide ($SiO_2$); and from about 3 wt % to about 13 wt % zirconium oxide ($ZrO_2$), wherein the amounts are by total weight of the composition. In one embodiment, the amount of kaolinite ranges from about 45 wt % to about 50 wt % by total weight of the composition. In another embodiment, the amount of kaolinite ranges from about 51 wt % to about 55 wt % by total weight of the composition. In yet another embodiment, the amount of kaolinite ranges from about 47 wt % to about 53 wt % by total weight of the composition. In a further embodiment, the largest dimension of any particle in the composition is from about 0.5 µm to about 25 µm.

Also presented herein is an article that includes: (a) a substrate; and (b) a bioceramic composition that includes particles dispersed throughout the substrate, wherein the bioceramic composition includes from about 45 wt % to about 55 wt % kaolinite ($Al_2Si_2O_5(OH)_4$); from about 5 wt % to about 15 wt % tourmaline; from about 3 wt % to about 13 wt % aluminum oxide ($Al_2O_3$); from about 11 wt % to about 19 wt % silicon dioxide ($SiO_2$); and from about 3 wt % to about 13 wt % zirconium oxide ($ZrO_2$), wherein the amounts are by total weight of the bioceramic composition. In one embodiment, the substrate includes at least one elastomer. In another embodiment, the substrate includes a polymer that is selected from polyoxybenzylmethylenglycolanhydride, polyvinyl chloride, polystyrene, polyethylene, polypropylene, polacrylonitrile, polylactic acid, and polyvinyl butyral. In yet another embodiment, the elastomer is selected from polychloroprene, nylon, a polyvinyl chloride elastomer, a polystyrene elastomer, a polyethylene elastomer, a polypropylene elastomer, a polyvinyl butyral elastomer, silicone, a thermoplastic elastomer, and combinations thereof.

In a further embodiment, the substrate includes a material selected from wool, silk, cotton, canvas, jute, glass, nylon, polyester, acrylic, elastane, polychloroprene, expanded polytetrafluoroethylene-containing laminate fabrics, and combinations thereof. In yet another embodiment, the substrate includes a metal selected from zinc, molybdenum, cadmium, scandium, titanium, vanadium, chromium, manganese, iron, cobalt, nickel, copper, zirconium, niobium, ruthenium, rhodium, palladium, silver, tantalum, tungsten, rhenium, osmium, iridium, platinum, gold, aluminum, gallium, indium, tin, and combinations thereof.

In one embodiment, the article is selected from apparel, jewelry, patches (e.g. patches that are fabricated to adhere to skin, such as transdermal patches, transdermal hydrogel patches, etc.), pads, insoles, bedding, body supports, foam rollers, lotions, soaps, tape, glassware, furniture, paints, inks, labels, carpets, mats, food and/or beverage containers, drink koozies, headware (e.g. helmets, hats, etc.), footwear (e.g. socks, shoes, etc.), gloves, and earphones. In another embodiment, the substrate includes a polymer and has a shape that is configured to receive a beverage container. In yet another embodiment, the article further includes at least one light emitting diode (LED), at least one magnet, or a combination thereof.

Also presented is a method for preparing a polymeric article that includes the steps of: (a) mixing a bioceramic composition that includes from about 45 wt % to about 55 wt % kaolinite ($Al_2Si_2O_5(OH)_4$); from about 5 wt % to about 15 wt % tourmaline; from about 3 wt % to about 13 wt % aluminum oxide ($Al_2O_3$); from about 11 wt % to about 19 wt % silicon dioxide ($SiO_2$); and from about 3 wt % to about 13 wt % zirconium oxide ($ZrO_2$), wherein the amounts are by total weight of the bioceramic composition, with a polymeric substrate while the substrate is in a liquid or fluid form; and (b) molding the polymeric substrate into a final shape or form. In one embodiment, the amount of kaolinite ranges from about 45 wt % to about 50 wt % by total weight of the bioceramic composition. In another embodiment, the amount of kaolinite ranges from about 51 wt % to about 55 wt % by total weight of the bioceramic composition. In yet another embodiment, the amount of kaolinite ranges from about 47 wt % to about 53 wt % by total weight of the bioceramic composition. In a further embodiment, the method further includes exposing the article to an electromagnetic signal at a frequency that is between about 0.05 Hz and about 20 MHz for a period of time from about 5 minutes to about 10 minutes.

Also presented is a method for reducing furfural content in a beverage by: exposing a beverage containing furfural to a bioceramic composition that includes from about 45 wt % to about 55 wt % kaolinite ($Al_2Si_2O_5(OH)_4$); from about 5 wt % to about 15 wt % tourmaline; from about 3 wt % to about 13 wt % aluminum oxide ($Al_2O_3$); from about 11 wt % to about 19 wt % silicon dioxide ($SiO_2$); and from about 3 wt % to about 13 wt % zirconium oxide ($ZrO_2$), wherein the amounts are by total weight of the bioceramic composition, for a time period suitable to reduce the furfural content.

DETAILED DESCRIPTION

Figure 1:
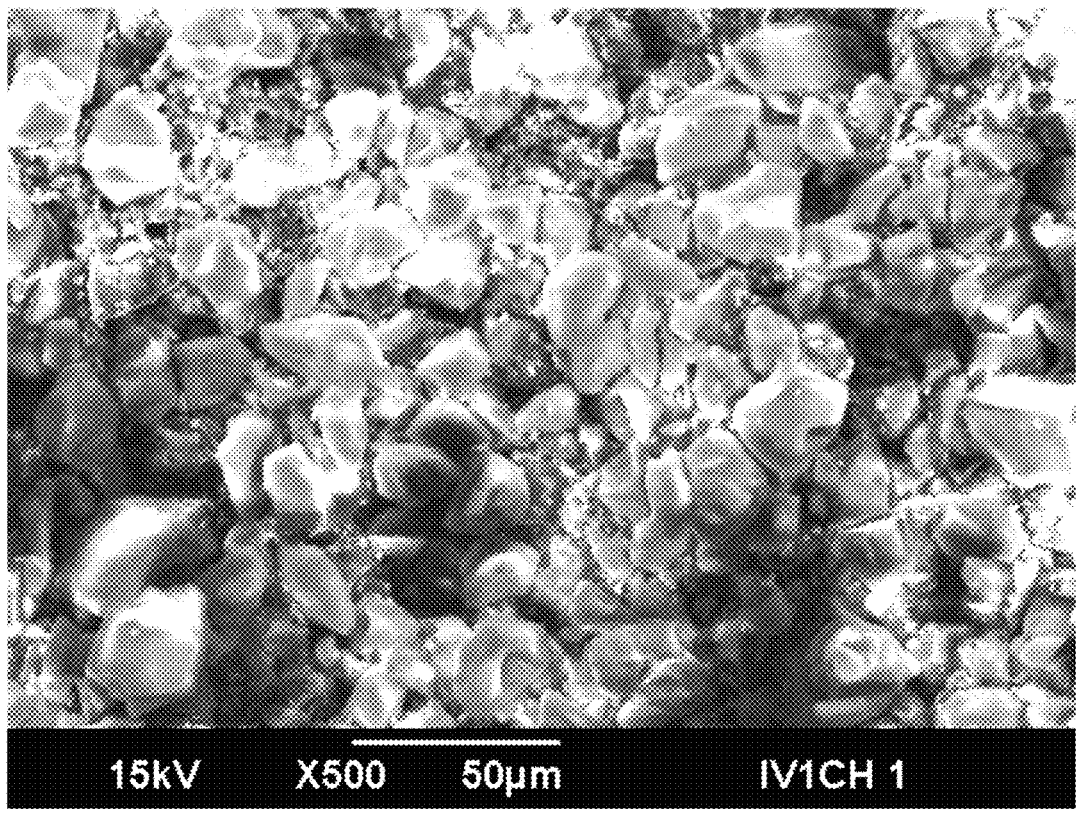
FIG. 1 is an electron microscopy image of a bioceramic composition prepared in accordance with various embodiments at 500× magnification.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The biological effects of bioceramics are based on the fact that the infrared frequency range is the natural resonant frequency range of water and living organisms. Because a considerable part of living organisms includes water, the resonant frequency of water molecules radiated from bioceramics can activate the water and affect living organisms.

This document describes bioceramic compositions that include from about 45 wt % to about 55 wt % of kaolinite ($Al_2Si_2O_5(OH)_4$); from about 5 wt % to about 15 wt % of tourmaline; from about 3 wt % to about 13 wt % of aluminum oxide ($Al_2O_3$); from about 11 wt % to about 19 wt % by weight of silicon dioxide ($SiO_2$); and from about 3 wt % to about 13 wt % zirconium oxide ($ZrO_2$), wherein the amounts are by total weight of the composition. In one embodiment, the amount of kaolinite in the bioceramic composition is selected from approximately 45 wt %, 46 wt %, 47 wt %, 48 wt %, 49 wt %, 50 wt %, 51 wt %, 52 wt %, 53 wt %, 54 wt %, and 55 wt % by total weight of the composition. In another embodiment, the amount of kaolinite ranges from about 45 wt % to about 50 wt % by total weight of the composition. In yet another embodiment, the amount of kaolinite ranges from about 51 wt % to about 55 wt % by total weight of the composition. In a further embodiment, the amount of kaolinite ranges from about 47 wt % to about 53 wt % by total weight of the composition. In one embodiment, the largest dimension of any particle in the bioceramic composition ranges from about 0.5 μm to about 25 μm. In another embodiment, the largest dimension of any particle in the bioceramic composition ranges from about 1 μm to about 20 μm. In yet another embodiment, the largest dimension of any particle in the bioceramic composition ranges from about 2 μm to about 15 μm.

As used herein, the term "tourmaline" retains its meaning known in the mineral and gemstone arts. For example, Tourmaline, according to "The Mineral & Gemstone Kingdom" website (http://www.minerals.net/tourmaline_chemical_formula.aspx), is "a group of isomorphous minerals with an identical crystal lattice. Each member of the Tourmaline group has its own chemical formula, due to small differences in their elemental distribution." According to language taken directly from the website:

A simple generic formula for the Tourmaline group is:

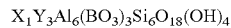
$X_1Y_3Al_6(BO_3)_3Si_6O_{18}(OH)_4$

Where: X=Na and/or Ca and Y=Mg, Li, Al, and/or $Fe^{2+}$

This creates the formula: $(Na,Ca)(Mg,Li,Al,Fe^{2+})_3Al_6(BO_3)_3Si_6O_{18}(OH)_4$ In some less common varieties, the Al may be replaced by other elements. For example, in Uvite, the Al is partially replaced by Mg.

This expands the formula to:

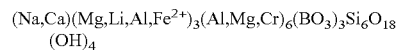
$(Na,Ca)(Mg,Li,Al,Fe^{2+})_3(Al,Mg,Cr)_6(BO_3)_3Si_6O_{18}(OH)_4$

Buergerite contains three O atoms and one F atom in place of the OH radical. A Buergerite molecule also contains an Fe atom that is in a 3+ oxidation state.

This further expands the formula to:

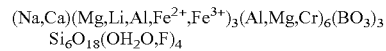
$(Na,Ca)(Mg,Li,Al,Fe^{2+},Fe^{3+})_3(Al,Mg,Cr)_6(BO_3)_3Si_6O_{18}(OH_2O,F)_4$ Finally, the website provides the chemical formulae of individual members of the Tourmaline group:

| | |
|---|---|
|  $NaFe^{2+}_3Al_6(BO_3)_3Si_6O_{18}(OH)_4$ | Schorl: |
|  $NaMg_3Al_6(BO_3)_3Si_6O_{18}(OH)_4$ | Dravite: |
| 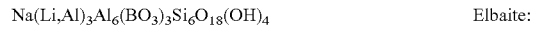 $Na(Li,Al)_3Al_6(BO_3)_3Si_6O_{18}(OH)_4$ | Elbaite: |
| 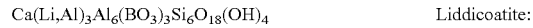 $Ca(Li,Al)_3Al_6(BO_3)_3Si_6O_{18}(OH)_4$ | Liddicoatite: |
| 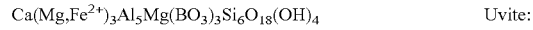 $Ca(Mg,Fe^{2+})_3Al_5Mg(BO_3)_3Si_6O_{18}(OH)_4$ | Uvite: |
|  $NaFe^{3+}_3Al_6(BO_3)_3Si_6O_{18}O_3F$ | Buergerite: |

Various embodiments also include articles that incorporate a bioceramic composition. In one embodiment, the bioceramic composition is present as a coating on at least a portion of the surface of the article or is incorporated directly into a substrate prior to or during manufacture of the article itself. In another embodiment, the substrate is a polymeric, cloth, or metallic material.

For example, in one embodiment a polymeric article is prepared by mixing a bioceramic composition with the polymeric substrate while the substrate is in a liquid or fluid form. The bioceramic/polymer material is then molded into the final desired shape or form. The amount of bioceramic composition incorporated into the polymeric substrate can be any suitable amount. In one embodiment, the bioceramic composition is added in an amount from about 1 wt % to about 35 wt % by total weight of the article. In another embodiment, the bioceramic composition is added in an amount from about 3 wt % to about 25 wt % by total weight of the article. In yet another embodiment, the bioceramic composition is added in an amount from about 5 wt % to about 15 wt % by total weight of the article. In a further embodiment, the bioceramic composition is added in an amount from about 7 wt % to about 13 wt % by total weight of the article. In another embodiment, the polymeric substrate is in the form of a cloth substrate, which is discussed in greater detail below.

The polymeric substrate can include any polymer that is useful for preparing an article that incorporates a bioceramic composition. For example, the polymeric substrate can include at least one elastomeric polymer or at least one non-elastomeric polymer. As used herein "polymeric" includes, but is not limited to, homopolymers, copolymers, crosslinked polymers and polymer systems, polymer blends that include continuous and/or dispersed phases, and the like.

Elastomers include, but are not limited to, viscoelastic polymers, such as, for example, natural rubbers, synthetic rubbers, rubbery, and rubber-like polymeric materials. One example of a synthetic rubber is polychloroprene (Neoprene). In one embodiment, the elastomer is selected from polychloroprene, nylon, a polyvinyl chloride elastomer, a polystyrene elastomer, a polyethylene elastomer, a polypropylene elastomer, a polyvinyl butyral elastomer, silicone, a thermoplastic elastomer, and combinations thereof.

Thermoplastic elastomers (TPEs) are composite materials obtained from the combination of an elastomeric material and a thermoplastic material. TPEs are elastomeric materials that are dispersed and crosslinked in a continuous phase of a thermoplastic material. Examples of conventional TPEs include Santoprene®, available from Advanced Elastomers Systems, Inc. and Sarlink® available from DSM Elastomers, Inc.

In one embodiment, the non-elastomer is selected from a group of polymers that includes, but is not limited to, polyoxybenzylmethylenglycolanhydride, polyvinyl chloride, polystyrene, polyethylene, polypropylene, polacrylonitrile, polyvinyl butyral, polylactic acid, and the like.

With respect to an article that includes a cloth substrate and a bioceramic composition, the bioceramic composition can be applied to the cloth by any process known in the cloth/fabric art using a liquid or fluid carrier that contains the bioceramic composition. For example, a silk-screen printing process can be employed. Silk-screen printing is a printing process which uses a form—referred to as a frame or sieve—that includes a fabric with a very fine mesh, which is left permeable to the ink in the areas of the image to be reproduced and impermeable in the other areas. In one embodiment, the bioceramic composition can be incorporated into an ink, which is then silk-screened onto at least a portion of the surface of the cloth substrate.

In another embodiment, the bioceramic composition is combined with one or more liquid polymers (e.g. polyester and/or the like). The bioceramic/polymer composition is then extruded using methods known in the art to form fibers that are used in preparing a cloth substrate.

The amount of bioceramic composition added to an ink or other liquid/fluid carrier can be any suitable amount. In one embodiment, the amount of the bioceramic composition ranges from about 1 wt % to about 35 wt % by total weight of the carrier and bioceramic composition. In another embodiment, the amount of the bioceramic composition ranges from about 3 wt % to about 25 wt % by total weight of the carrier and bioceramic composition. In yet another embodiment, the amount of the bioceramic composition ranges from about 5 wt % to about 15 wt % by total weight of the carrier and bioceramic composition. In a further embodiment, the amount of the bioceramic composition ranges from about 7 wt % to about 13 wt % by total weight of the carrier and bioceramic composition.

Cloth substrates useful herein include fabric or textile substrates prepared by any method known to one of skill in the cloth fabrication art. Such techniques include, but are not limited to, weaving, knitting, crocheting, felting, knotting, bonding, and the like. Suitable starting materials for the cloth substrates include natural or synthetic (e.g. polymeric) fibers and filaments. In one embodiment, the cloth substrate includes, but is not limited to, a material selected from wool, silk, cotton, canvas, jute, glass, nylon, polyester, acrylic, elastane, polychloroprene, expanded polytetrafluoroethylene-containing laminate fabrics (e.g. Gore-Tex® fabric), and combinations thereof.

With respect to an article that includes a metallic substrate, the bioceramic composition can be applied to the metal in a liquid/fluid form by any process known in the metal processing art. For example, the bioceramic composition can be incorporated into a liquid/fluid carrier, such as, but not limited to, a paint, sealant, varnish, and the like, and applied to at least a portion of the surface of the metallic substrate. The amount of bioceramic composition added to a paint or other liquid/fluid carrier can be any suitable amount. In one embodiment, the amount of the bioceramic composition added to a paint or other liquid/fluid carrier ranges from about 1 wt % to about 35 wt % by total weight of the carrier and bioceramic composition. In another embodiment, the amount of the bioceramic composition added to a paint or other liquid/fluid carrier ranges from about 3 wt % to about 25 wt % by total weight of the carrier and bioceramic composition. In yet another embodiment, the amount of the bioceramic composition added to a paint or other liquid/fluid carrier ranges from about 5 wt % to about 15 wt % by total weight of the carrier and bioceramic composition. In a further embodiment, the amount of the bioceramic composition added to a paint or other liquid/fluid carrier ranges from about 7 wt % to about 13 wt % by total weight of the carrier and bioceramic composition.

Suitable metallic substrates for use herein include any metallic substrate that is useful for preparing an article that incorporates a bioceramic composition. Exemplary metallic substrates include pure metals and alloys. In one embodiment, the metallic substrate is selected from zinc, molybdenum, cadmium, scandium, titanium, vanadium, chromium, manganese, iron, cobalt, nickel, copper, zirconium, niobium, ruthenium, rhodium, palladium, silver, tantalum, tungsten, rhenium, osmium, iridium, platinum, gold, aluminum, gallium, indium, tin, and the like.

Virtually any article that is capable of incorporating a bioceramic composition is suitable. In one embodiment, the article is selected from apparel (e.g. garments), jewelry, patches (e.g. patches that are fabricated to adhere to skin, such as transdermal patches, transdermal hydrogel patches, etc.), pads, insoles, bedding, body supports, foam rollers, lotions, soaps, tape, glassware, furniture, paints, inks, labels, carpets, mats, food and/or beverage containers, drink koozies (e.g. bottle or can), headwear (e.g. helmets, hats, etc.), footwear (e.g. shoes, sneakers, sandals, etc.), earphones, and the like.

In another embodiment, the article is apparel selected from shirts, pants, shorts, dresses, skirts, jackets, hats, undergarments, socks, caps, gloves, scarves, diapers, and the like. In yet another embodiment, the article is jewelry selected from bracelets, necklaces, earrings, medallions, pendants, rings, and the like. In still another embodiment, the article is bedding selected from blankets, sheets, pillows, pillow cases, comforters, duvet covers, mattress covers, mattress pads, and the like. In another embodiment, the article is a body support selected from knee wraps, elbow supports, compression arm sleeves, compression leg sleeves, wrist wraps, and the like.

Optionally, articles can further include at least one light emitting diode (LED), at least one magnet, or a combination thereof.

Optionally, articles can further include one or more additional frequencies imprinted on the article using a frequency generator, i.e., a signal generating machine that emits an electromagnetic signal (audio or radio waves) at a selected frequency or frequencies. Examples of commercially available frequency generators include, but are not limited to Rife Machines (e.g. ProWave 101; F-Scan2; TrueRife F-117; Wellness Pro 2010; Global Wellness; GB4000; GB4000 BCX Ultra; and the like. In general, frequency generators produce selected frequencies that are then transmitted through a connecting cable to a commercially available frequency imprinting plate (e.g. SP9 or SP12 vortex frequency imprinting plates). In one embodiment, the frequency or frequencies range from about 0.05 Hz to about 20 MHz. In another embodiment, the frequency or frequencies range from about 5 Hz to about 5 MHz. In a further embodiment, the frequency or frequencies range from about 100 Hz to about 0.1 MHz. In yet another embodiment, the frequency or frequencies range from about 1 KHz to about 10 KHz. The article to be imprinted with the selected frequency or frequencies is exposed to the frequency emitted by the generator. To accomplish this, the article may be placed on the imprinting plate and exposed to the signal of the selected frequency or frequencies for imprinting. In one embodiment, the imprinting process takes about 5-10 minutes per cycle depending upon the amount of frequencies to be imprinted and the selected imprinting program. In another embodiment, the imprinting process takes about 5 minutes, 6 minutes, 7 minutes, 8 minutes, 9 minutes, or 10 minutes per cycle depending upon the amount of frequencies to be imprinted and the selected imprinting program Imprinted articles may transmit the frequency imprints to a user upon contact in conjunction with the waves emitted from the bioceramic composition that is incorporated into the article.

Figure 4:
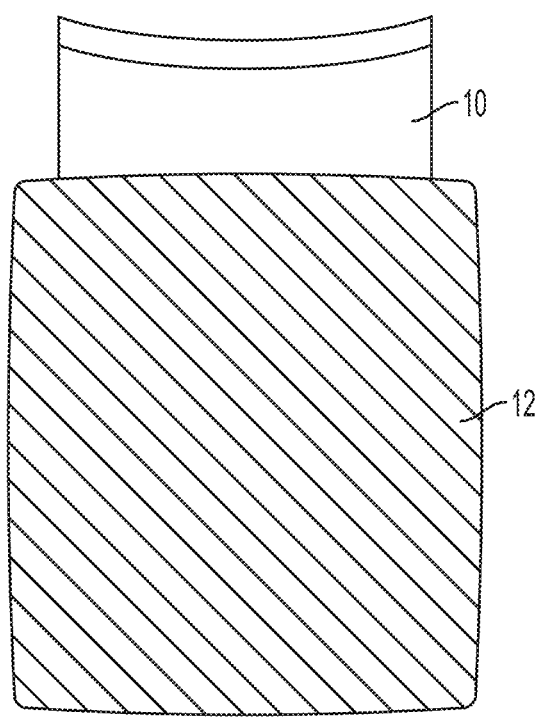
FIG. 4 is a front view of a beverage container inside a beverage koozie.

Another embodiment includes a method of freshening a beverage by exposing the beverage to a container that contains or is adjacent to a bioceramic composition. For example, one method may reduce furfural content in beer by exposing beer containing furfural to a bioceramic composition. For example, as shown in FIG. 4, the bioceramic composition can be incorporated into or applied to at least a portion of the surface of the beer's container 10, such as through a beverage koozie 12. In one embodiment, the bioceramic composition is mixed with a foam precursor that is later used to form the koozie 12. In another embodiment, the bioceramic composition is applied to at least a portion of the surface of the koozie 12 by any coating method known in the art (e.g. applying a liquid carrier containing the bioceramic composition to the koozie 12 by spraying, painting, dipping, and the like). The amount of bioceramic composition incorporated into or applied on the koozie 12 can be any suitable amount. In one embodiment, the amount of the bioceramic composition ranges from about 1 wt % to about 35 wt % by weight of the foam in the koozie. In another embodiment, the amount of the bioceramic composition ranges from about 3 wt % to about 25 wt % by weight of the foam in the koozie. In yet another embodiment, the amount of the bioceramic composition ranges from about 5 wt % to about 15 wt % by weight of the foam in the koozie. In yet another embodiment, the amount of the bioceramic composition ranges from about 7 wt % to about 13 wt % by weight of the foam in the koozie.

The koozie 12 is then placed around a bottle or can 10 containing beer tainted with furfural. The bottle or can 10 remains in the koozie 12 for a time period suitable to reduce the furfural content. In one embodiment, the time period is on the order of minutes (e.g. less than 5 minutes, 5 minutes, 10 minutes, 15 minutes, greater than 15 minutes, etc.). The bioceramic composition can also be incorporated into or on the surface of a beverage container (e.g. can, bottle, or the like) or into or on a label or sticker to be affixed to a bottle or can containing beer or another beverage to be treated. Water or any other beverage can also be treated with the bioceramic composition in a similar manner.

The following non-limiting examples serves to further illustrate the present invention.

EXAMPLES

Example 1: Preparation of a Bioceramic Powder Composition

The kaolinite is extracted in the outskirts of the city of Parintins, in the Amazon State, Brazil. The city is located in the Lower Amazon Region (coordinates: latitude: 2° 37' 42" south/longitude: 56° 44' 11" west of Greenwich, 50 m above sea level).

The extracted kaolinite is washed with hydrogen peroxide ($H_2O_2$) and allowed to dry. The dried kaolinite is then finely ground and mixed with tourmaline; aluminum oxide ($Al_2O_3$); silicon dioxide ($SiO_2$); and zirconium oxide ($ZrO_2$) until a homogeneous mixture is achieved. The resulting bioceramic composition contains 50 wt % kaolinite, 10 wt % tourmaline, 18 wt % aluminum oxide, 14 wt % silicon dioxide, and 8 wt % zirconium oxide. The electron microscopy image in FIG. 1 demonstrates that the composition includes bioceramic particles smaller than 1 micrometer.

Example 2: Impregnating Fabric

Figure 2:
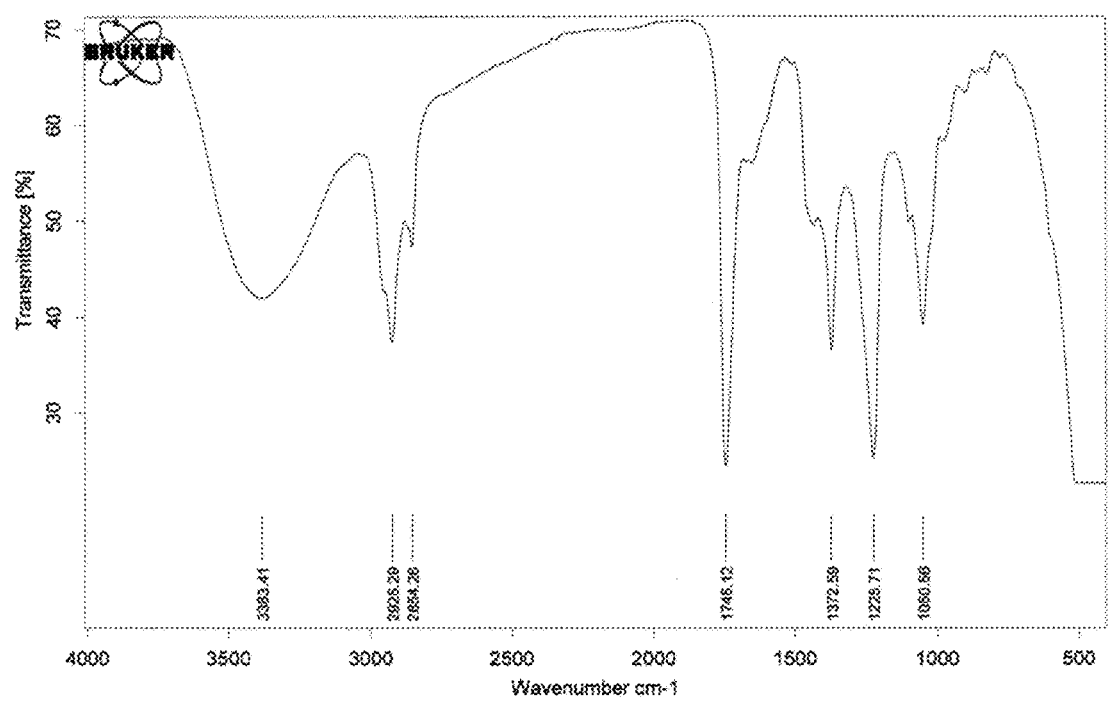
FIG. 2 is a graph of the spectral transmittance of the bioceramic composition also analyzed in FIG. 1 deposited on a cloth substrate (88% polyamide and 12% elastane).
Figure 3:
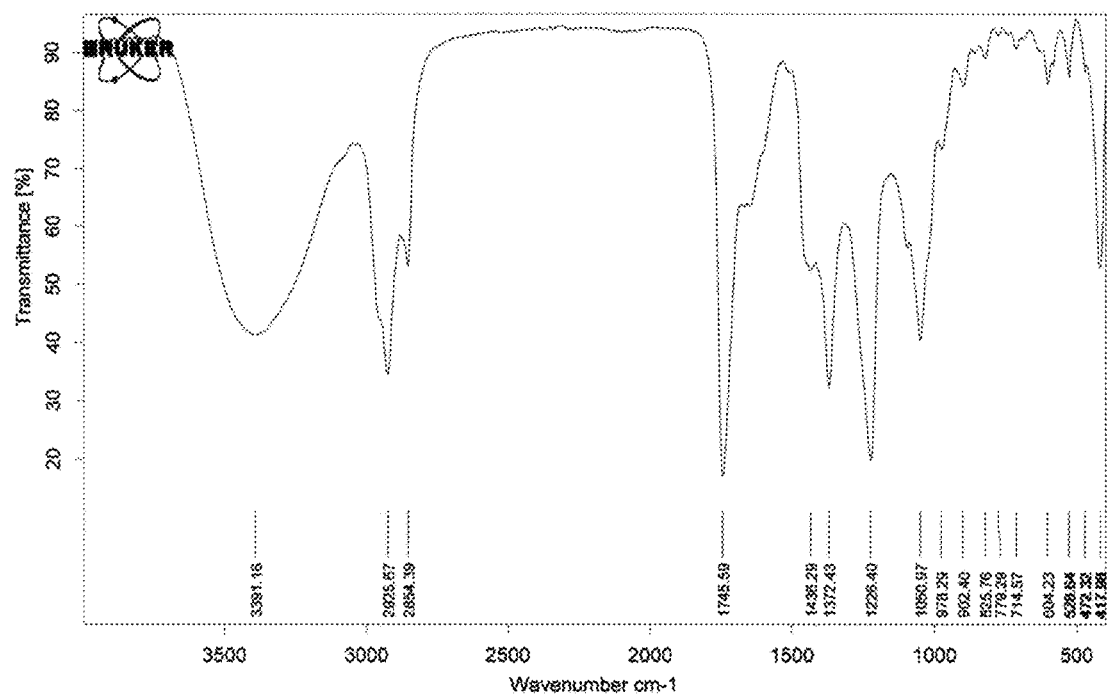
FIG. 3 is a graph of the spectral transmittance of the bioceramic composition also analyzed in FIG. 1 (impregnated in fabric)

A cloth substrate that includes 88 wt % polyamide and 12 wt % elastane was obtained. A bioceramic composition prepared according to the method of Example 1 was incorporated into a plastinol ink in an amount of 10 wt % and mixed. The mixture was applied to the cloth substrate using a traditional silkscreen process. FIG. 2 is a graph of the spectral transmittance of the bioceramic composition deposited on the cloth substrate. FIG. 3 is a graph of the spectral transmittance of the bioceramic composition impregnated in fabric. The numbered peaks in FIGS. 2 and 3 indicate that the bioceramic composition absorbs infrared radiation when incorporated into fabric.

Example 3: Beverage Freshness

A beverage koozie that includes closed-cell extruded polystyrene foam was obtained. A bioceramic composition prepared according to the method of Example 1 was incorporated into a plastic-based paint in an amount of 10% by weight of the paint composition and mixed. The mixture was applied to the interior surface of the koozie. An extruded plastic composition containing the bioceramic composition in an amount of 10% by weight of the plastic was also prepared using a traditional extrusion process. The extruded plastic composition was placed in the bottom of the koozie.

Figure 5:
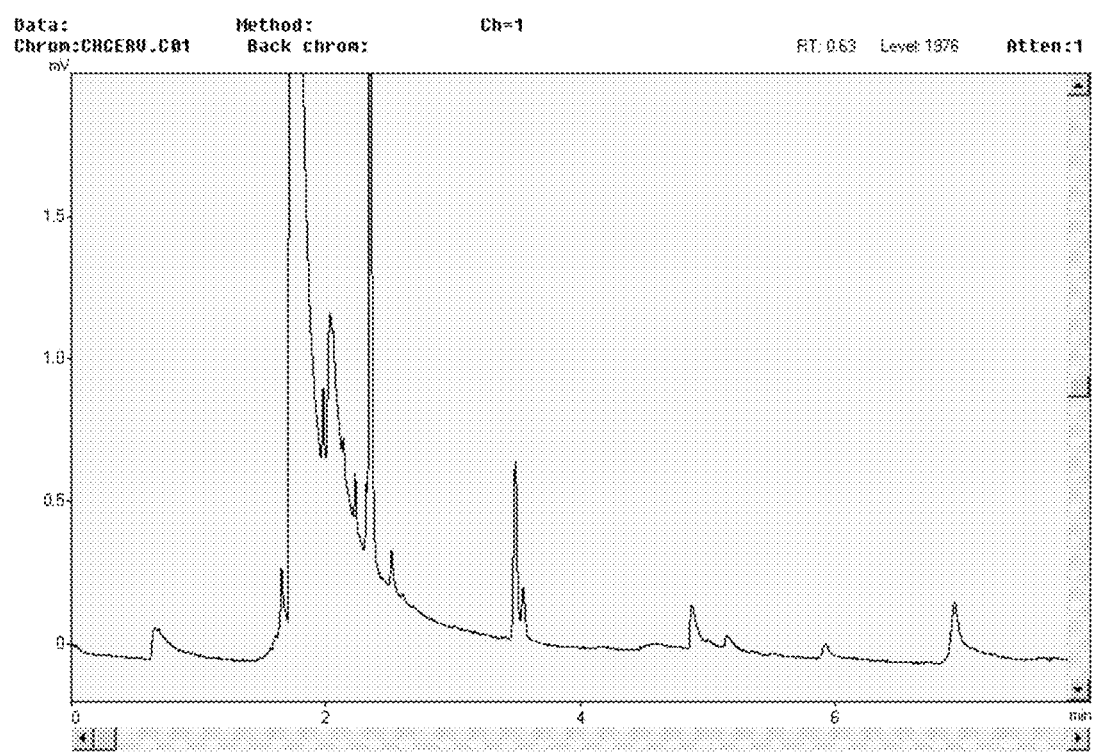
FIG. 5 is a mass spectrum of a 10 mL beer sample prior to exposure to a bioceramic composition.
Figure 6:
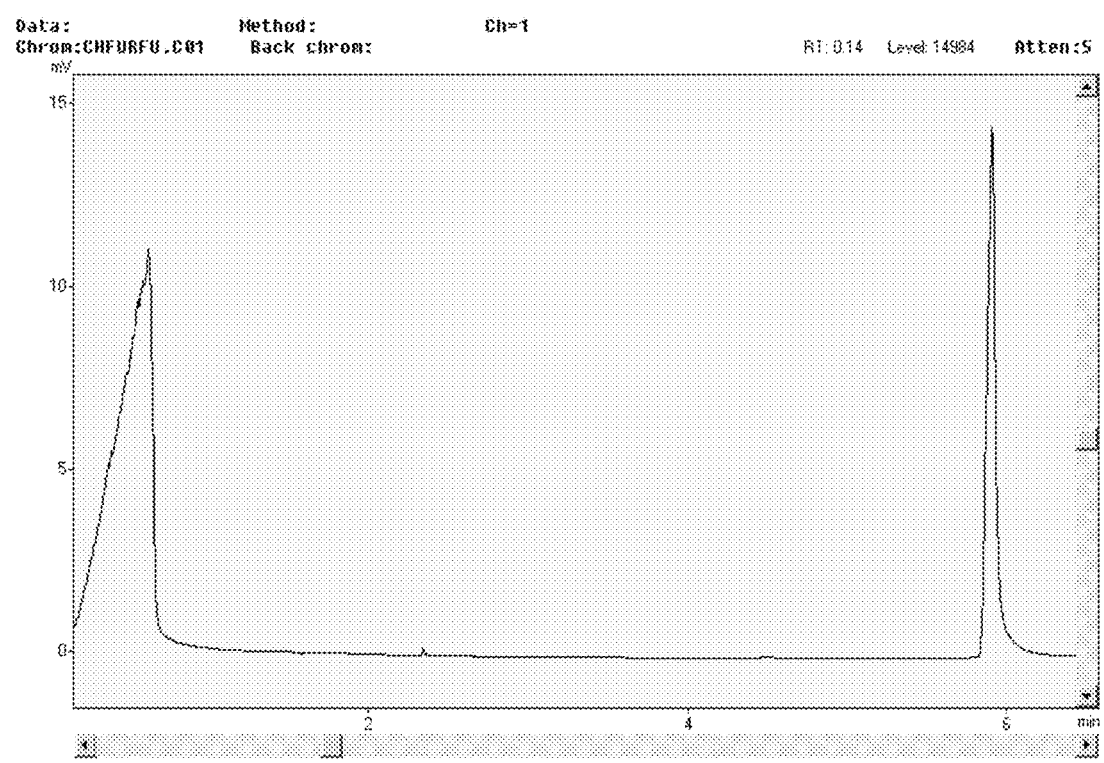
FIG. 6 is a mass spectrum of furfural.
Figure 7:
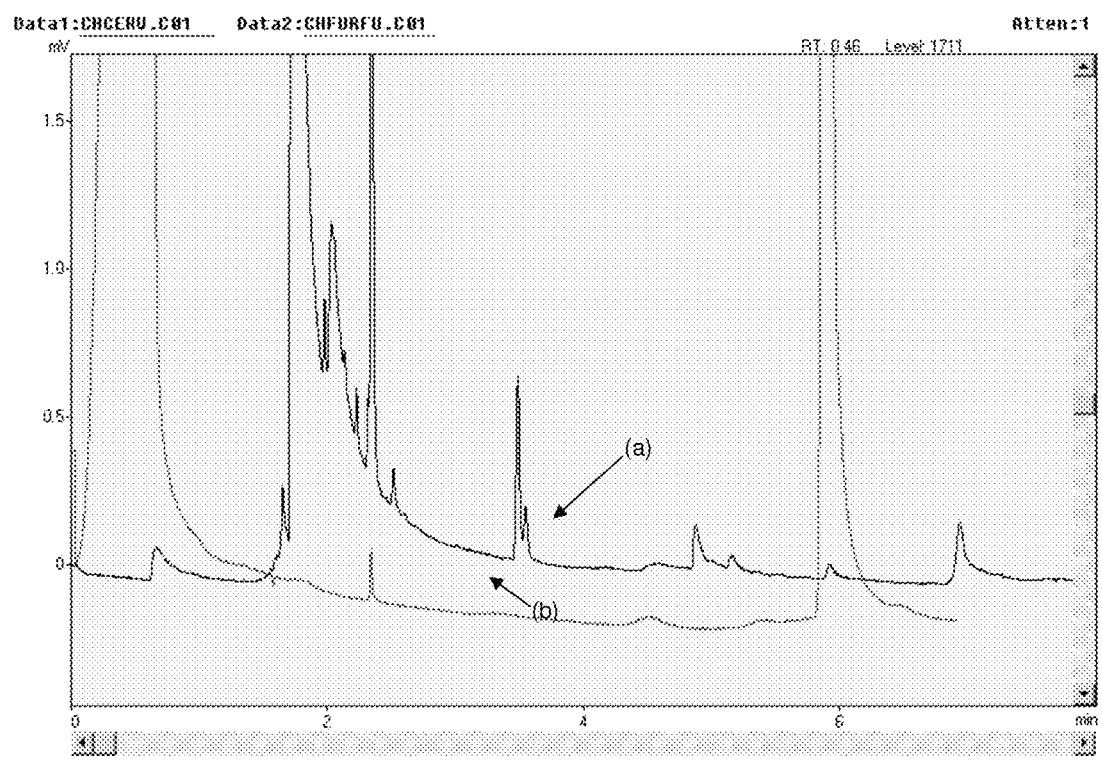
FIG. 7 is an overlay of (a) the mass spectrum of a 10 mL beer sample prior to exposure to a bioceramic composition and (b) the mass spectrum of furfural.

A 10 mL sample of beer that had not yet been exposed to the bioceramic composition in the koozie was analyzed using gas chromatography-mass spectrometry (GC-MS) (FIG. 5). A comparison of FIG. 5 with FIG. 6 (mass spectrum of furfural) revealed the presence of peaks corresponding to furfural in the beer sample (FIG. 7).

Figure 8:
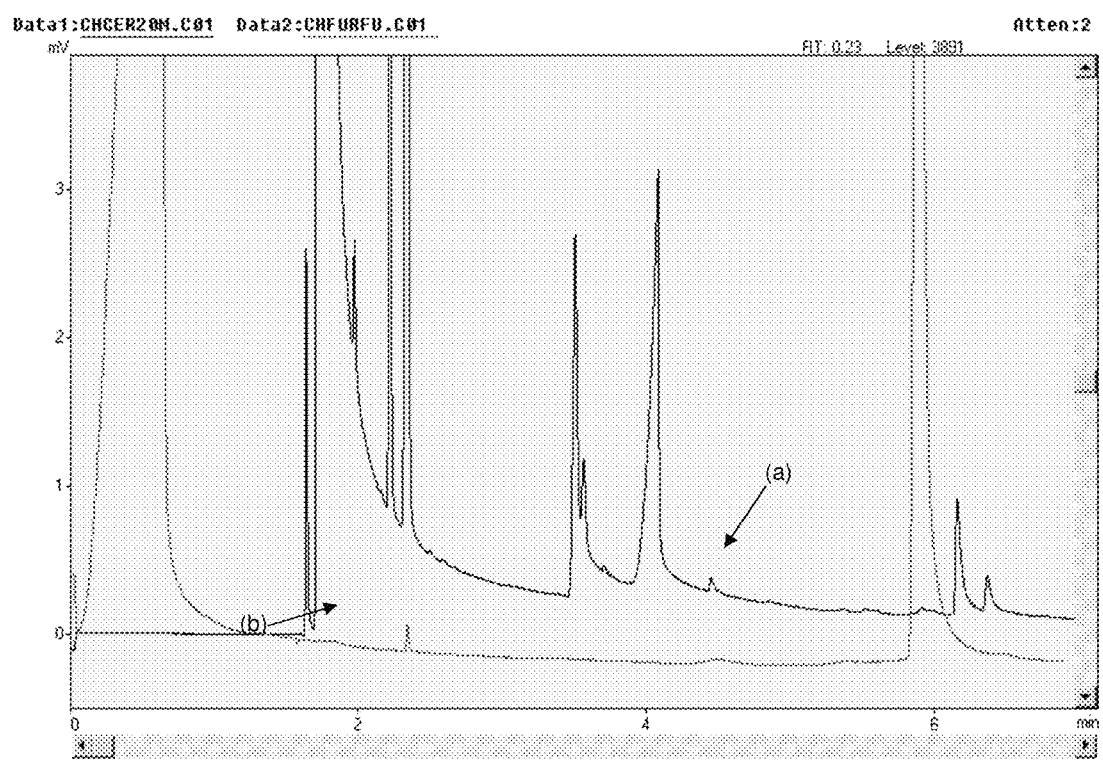
FIG. 8 is an overlay of (a) a mass spectrum of the 10 mL beer sample following exposure to a bioceramic composition and (b) the mass spectrum of furfural.

A can containing the same beer from which the sample was obtained was then placed inside the bioceramic-treated koozie for 10 minutes. The treated koozie covered about ⅔ of the outer surface of the can Immediately after the 10-minute exposure period, a sample of beer was withdrawn from the can and analyzed using GC-MS (FIG. 8). The analysis revealed the disappearance of furfural from the beer. As shown in FIG. 8, the mass spectrum of the treated beer contained no peaks corresponding to furfural.

All publications cited in the specification, both patent publications and non-patent publications, are indicative of the level of skill of those skilled in the art to which this invention pertains. All these publications are herein fully incorporated by reference to the same extent as if each individual publication were specifically and individually indicated as being incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A fabric or a textile comprising a bioceramic composition consisting of:
    a) from about 47 wt % to about 53 wt % kaolinite ($Al_2Si_2O_5(OH)_4$);
    b) from about 5 wt % to about 15 wt % tourmaline;
    c) from about 11 wt % to about 19 wt % silicon dioxide ($SiO_2$);
    d) from about 3 wt % to about 18 wt % aluminum oxide ($Al_2O_3$); and
    e) one additional oxide;
    wherein the amounts are by total weight of the composition, wherein the bioceramic composition is applied to or incorporated into the fabric or the textile.

2. The bioceramic composition of claim 1, wherein the one additional oxide is zirconium oxide ($ZrO_2$).

3. The bioceramic composition of claim 2, wherein the amount of said zirconium oxide ($ZrO_2$) is from about 3 wt % to about 13 wt % zirconium oxide ($ZrO_2$) by total weight of the composition.

4. A method for manufacturing a fabric or a textile article comprising the steps of:
    a. forming a mixture consisting of from about 47 wt % to about 53 wt % kaolinite ($Al_2Si_2O_5(OH)_4$); from about 5 wt % to about 15 wt % tourmaline; from about 11 wt % to about 19 wt % silicon dioxide ($SiO_2$); from about 3 wt % to about 18 wt % of aluminum oxide ($Al_2O_3$), and one additional oxide; and
    b. applying the mixture to or incorporating the mixture into the fabric or the textile article.

5. The method of claim 4, provided that the incorporating step comprises silk-screen printing.

6. The method of claim 4, wherein the one additional oxide is: zirconium oxide ($ZrO_2$).

7. The method of claim 5, provided that the one additional oxide is from about 3 wt % to about 13 wt % zirconium oxide ($ZrO_2$).

* * * * *